United States Patent

Holly

[15] 3,693,213
[45] Sept. 26, 1972

[54] MOLDING APPARATUS
[72] Inventor: James A. Holly, Richton Park, Ill.
[73] Assignee: Hollymatic Corporation
[22] Filed: June 15, 1971
[21] Appl. No.: 153,376

Related U.S. Application Data

[63] Continuation-in-part of Ser. No. 26,814, April 9, 1970, Pat. No. 3,654,665.

[52] U.S. Cl. ................................................17/32
[51] Int. Cl. ..............................................A22c 7/00
[58] Field of Search.........................................17/32

[56] References Cited

UNITED STATES PATENTS

| | | |
|---|---|---|
| 3,241,178 | 3/1966 | Bridge, Jr. ......................17/32 |
| 3,417,425 | 12/1968 | Holly.............................17/32 |
| 3,526,924 | 9/1970 | Holly.............................17/32 |

Primary Examiner—Lucie H. Laudenslager
Attorney—Axel A. Hofgren et al.

[57] ABSTRACT

A molding apparatus for forming articles and particularly patties from a moldable material and specifically ground meat, fish and the like in which there are a hopper for retaining the material and including an extruding section with passage means from this section, a feeder in the extruding section movable away from and toward a position adjacent the passage means to force material therethrough, a movable mold having a mold opening movable away from and toward the passage means out of and into communication therewith to receive material from the extruding section when the opening is in communication with the passage means and the feeder is in its adjacent position and a catch operatively engaging the feeder comprising a pivoted lever having a latch portion of extensive surface area engaging a retainer also having a retaining portion of similar surface area to retain the feeder adjacent the passage until the mold opening has been moved out of communication with the passage.

18 Claims, 8 Drawing Figures

INVENTOR.
JAMES A. HOLLY

BY Hofgren, Wegner, Allen, Stillman & McCord.

ATTORNEYS.

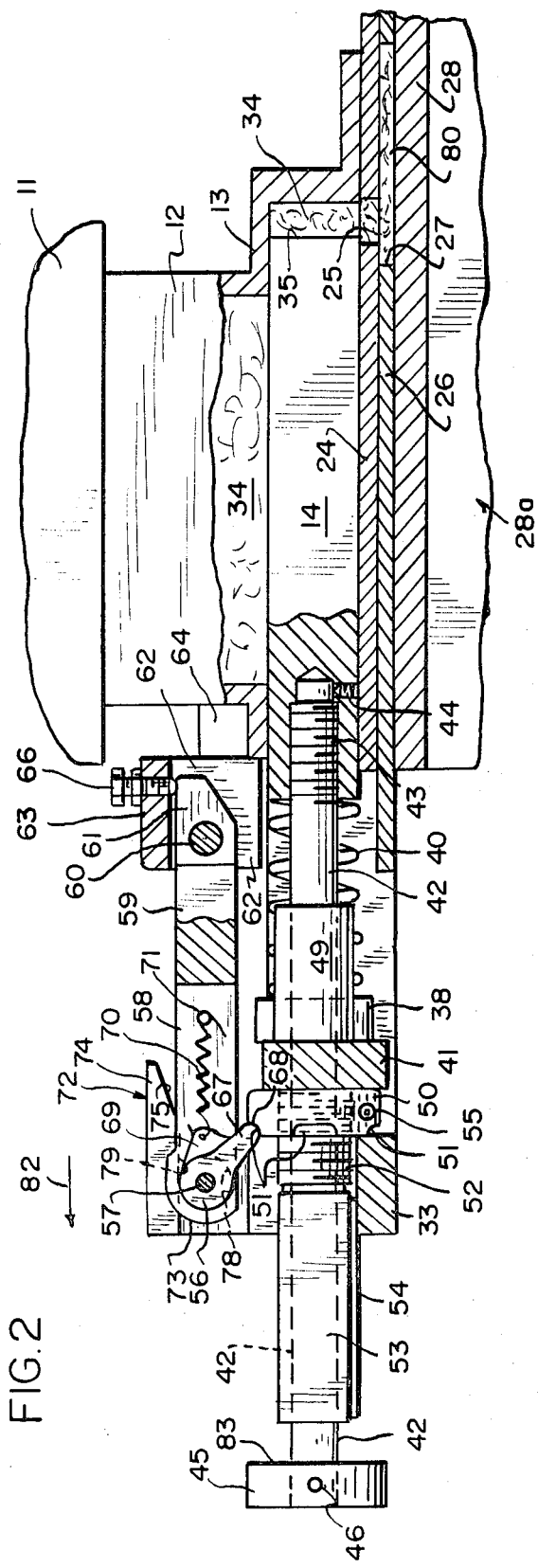
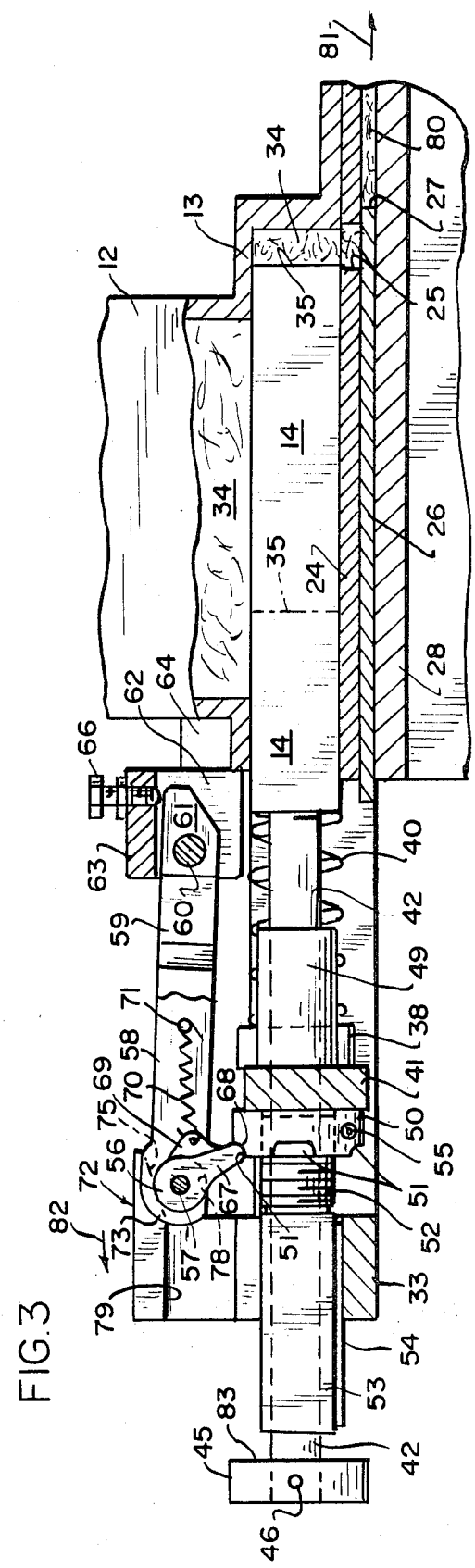
FIG.2
FIG.3

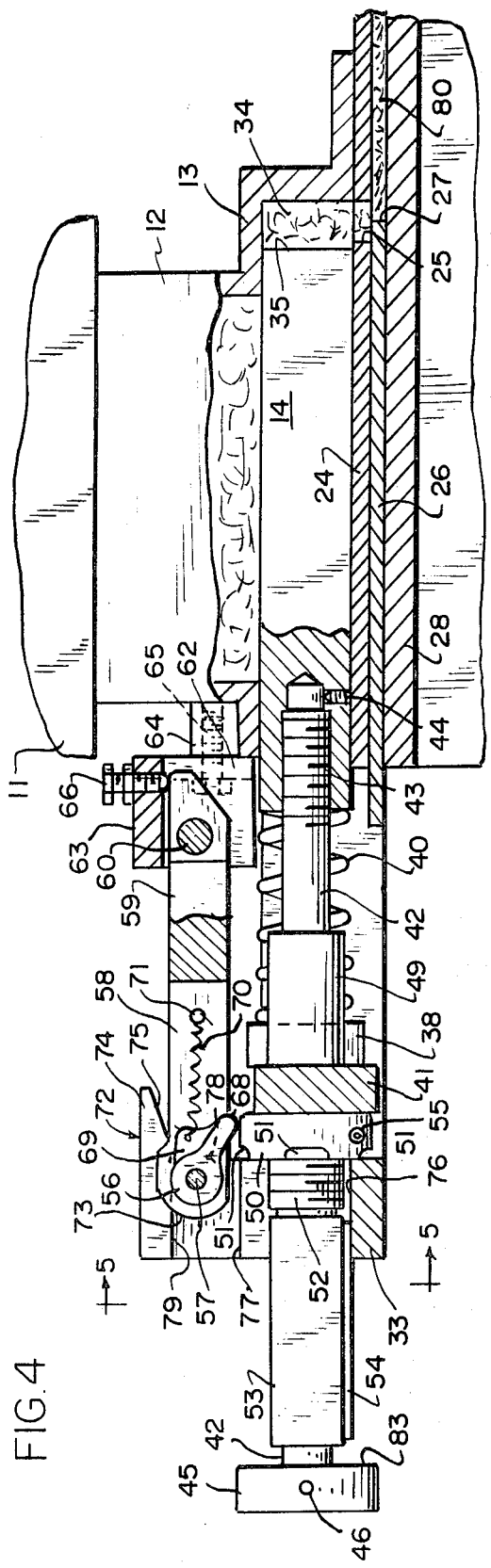
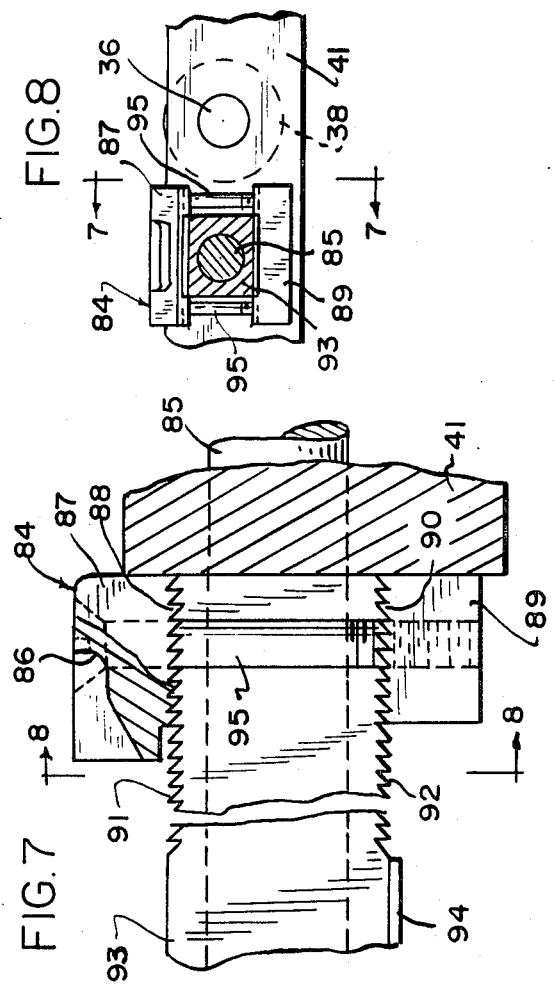
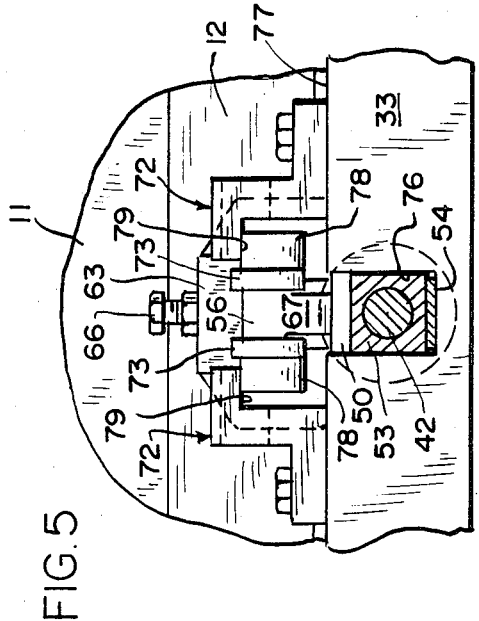

MOLDING APPARATUS

CROSS-REFERENCE TO RELATED APPLICATION

This application is a continuation-in-part of my copending application Ser. No. 26,814, filed Apr. 9, 1970 now U.S. Pat. No. 3,654,665, issued Apr. 11, 1972.

BACKGROUND OF THE INVENTION

In my prior U.S. Pat. No. 3,417,425 dated Dec. 24, 1968 there is disclosed a molding apparatus utilizing a reciprocable feeder in a hopper for forcing material into a mold opening which is then moved to ejecting position where the mold opening is exposed for removal of the thusly formed article. In this patent there is disclosed and claimed a catch structure for retaining the feeder in fixed position with the material in the mold opening under pressure until the mold opening has been moved out of conjunction with the material that is under compression by the feeder.

In my prior application Ser. No. 865,628 filed Oct. 13, 1969 there is disclosed and claimed a molding apparatus of the above type in which there is provided a retainer on a portion of the feeder operating apparatus for holding the catch in engagement with the feeder portion of the apparatus to prevent accidental disengagement prior to the time the mold opening has been moved out of communication with the plastic material under pressure.

One of the features of this invention is to provide an improved structure including an improved catch and catch retainer that is more positive in its operation, that is less subject to wear under the conditions encountered during operation of the apparatus and that is particularly adapted for use in heavy duty multiple patty machines of the type disclosed and claimed in the above application of which the present application is a continuation-in-part.

SUMMARY OF THE INVENTION

In general the apparatus of this invention provides a catch for holding the feeder in material compressing position until the mold opening has been moved out of conjunction with the material that is under pressure by the feeder in which the catch comprises a pivoted lever having a latch portion of extensive surface area engaging a retainer having a retaining portion of similar extensive surface area with engagement of these two areas holding the feeder in material compressing position. These two elements are, of course, included with the other necessary elements of the molding apparatus combination including the hopper, feeder, movable mold and operating means for the feeder and the mold.

BRIEF DESCRIPTION OF THE DRAWINGS

FIG. 2 is an enlarged fragmentary sectional view taken substantially along line 2—2 of FIG. 1 and showing the feeder and catch in position retaining the feeder adjacent the passage from the hopper.

FIG. 3 is a view similar to FIG. 2 but illustrating the position of the parts when the feeder operating apparatus has started its rearward movement preparatory to releasing the catch and indicating in broken lines the rearwardmost position of the forward edge of the feeder.

FIG. 4 is a view similar to FIGS. 2 and 3 but illustrating the forward movement of the feeder just before it has reached its extreme forward position of FIG. 2.

FIG. 5 is a vertical sectional view substantially along line 5—5 of FIG. 4.

FIG. 7 is an enlarged fragmentary side elevational view partially broken away of a second embodiment of a retainer portion of the invention and taken substantially along line 7—7 of FIG. 8.

FIG. 8 is a reduced sectional view taken substantially along line 8—8 of FIG. 7.

DESCRIPTION OF THE PREFERRED EMBODIMENTS

Figure 1:
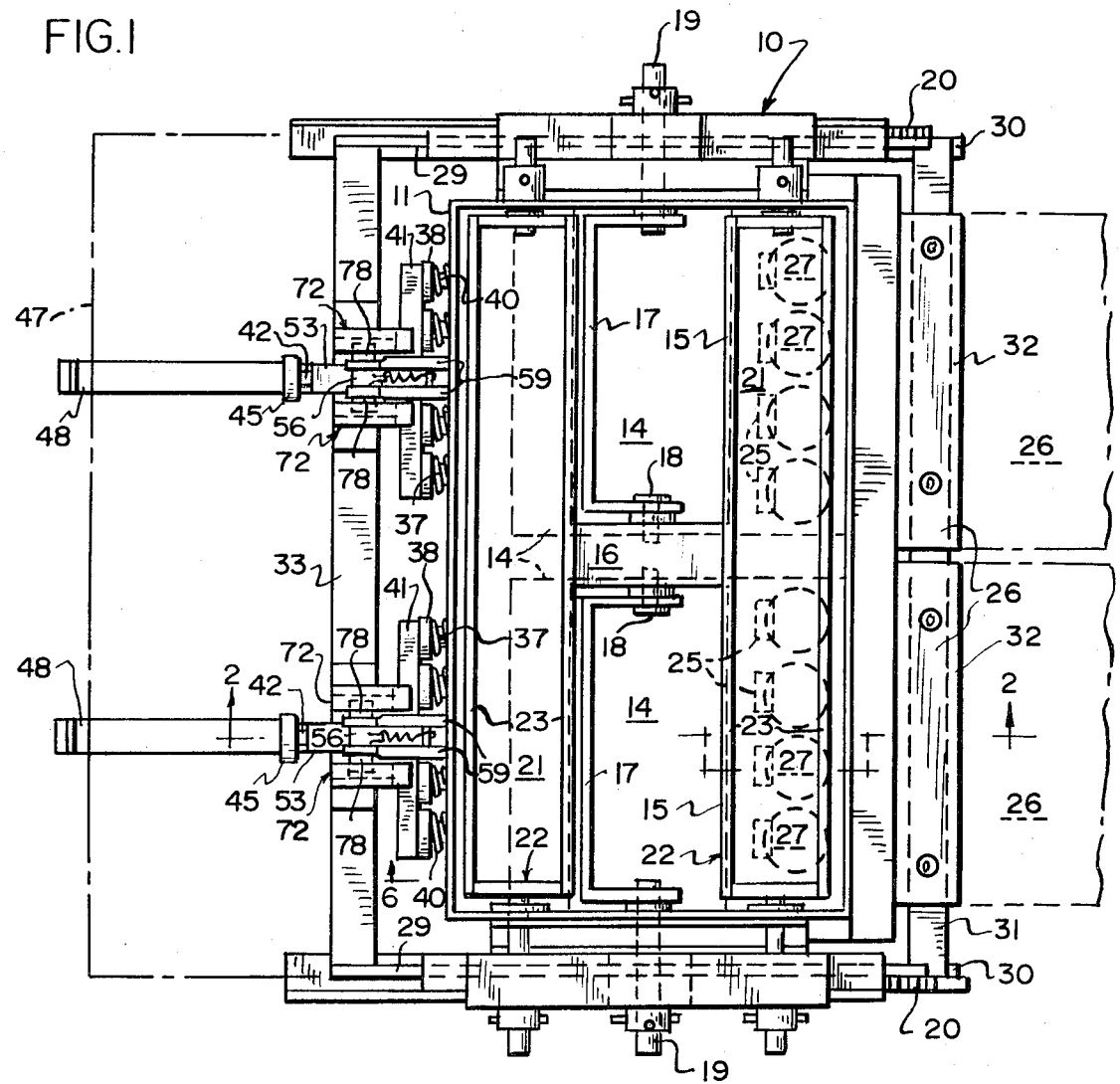
FIG. 1 is a plan view of a multiple patty apparatus embodying the invention and operable to form eight circular patties of food material simultaneously.

The molding apparatus 10 shown in the accompanying drawings and in plan view in FIG. 1 is substantially the same as the apparatus shown, described and claimed in the above copending application No. 26,814 of which the present application is a continuation-in-part by adding thereto the improved catch structure of this invention.

In the apparatus 10 there is provided a hopper 11 for the moldable material such as ground raw beef, other types of meat, fish and the like with the hopper having a bottom section 12 leading downwardly to an extruding section 13 in which a ram or feeder means 14 is located. Actually, in the illustrated embodiment there are a pair of these feeders 14 that are arranged side-by-side, although only a single feeder could be used in a hopper approximately one-half as large as the one illustrated if such were desired.

As is disclosed and claimed in the prior application No. 26,814 the bottom section 12 of the hopper is divided into two side-by-side portions 15 by a central dividing well or partition 16. Each section 15 is provided with a bail type agitator 17 having adjacent ends mounted on stub shafts 18 aligned and extending into the dividing wall 16. The opposite ends of the agitator 17 are each mounted on an axle 19 so as to be reciprocable within their hopper sections 15 by a rack 20 mounted on the operating mechanism for the feeder, as is described and shown more fully in the above application No. 26,814.

The portion of the hopper 11 above the bottom section 12 extends laterally and upwardly to provide the spaces 21. Rotatable in each of these spaces 21 is a mover device 22 each having a pair of parallel rods 23. These devices 22 are rotated in increments to dislodge material from the hopper on opposite sides of the bottom sections 15 and move the dislodged material into the bottom section 12 in each half of the hopper so as to be acted upon by the reciprocation of each of the two feeders 14. The structure and operation of the mover devices 22 are covered in more detail in the above application No. 26,814. They are not shown or disclosed in greater detail here as they form no part of the claimed invention in this application.

Each reciprocable feeder 14 is moved in a linear path on top of a plate 24 which contains the fill slots or passages 25 at the forward end of the extruding section 13 at the bottom of the hopper. Mounted for horizontal movement beneath this plate 24 is a mold plate 26 containing the mold openings 27. This mold plate 26 is horizontally reciprocable between the bottom of the feeder supporting plate 24 and the top of a base plate 28 that is a part of the supporting cabinet 28a. As can be seen in FIG. 1 in the embodiment illustrated there are a pair of these mold plates 26 arranged side-by-side and coplanar and each containing four mold openings 27 of circular shape to produce circular patties and with each mold opening 27 being supplied by its own fill slot passage 25.

The openings 27 of the mold plates 26 are moved simultaneously into communication with the fill passages 25, as illustrated in FIG. 2 which shows the extreme rearward position of the mold plates 26 and the extreme forward positions of the feeders 14. The extreme extended positions of the plates 26 are illustrated by the broken lines of the right side of FIG. 1. This structure is described and claimed in the above copending application No. 26,814 and the apparatus that provides this movement as explained therein includes a pair of top racks 29 at the opposite ends of the apparatus with the teeth (not shown) facing downwardly and cooperating bottom racks 30 each parallel to a rack 29 and with teeth (also not shown) facing upwardly and each pair of racks engaging a pinion gear (not shown) at the end of the apparatus.

The forward ends of the bottom racks 30 are connected by means of a cross bar 31 to the forward ends 32 of the two mold plates 26. The rear ends of the top racks 29 are connected by a horizontal bar 33. The result is that as the cooperating racks are reciprocated back and forth the top racks 29 move forwardly to the position shown in FIGS. 1 and 2 to force the feeder or feeders 14 to their forwardmost positions while simultaneously the bottom racks 30 are moved rearwardly to a rearwardmost position as shown in solid lines in FIGS. 1 and 2 where the mold openings 27 of the pair of mold plates 26 are in communication with the fill slot passages 25 to receive the moldable material 34 which is under the compressive force of the feeder rams 14.

The apparatus and the portions thereof described above are shown and described in more detail and claimed in the above copending application No. 26,814 of which the present application is a continuation-in-part. For this reason and because these portions of the apparatus are not specifically claimed herein they are not shown and described in further detail.

Figure 6:
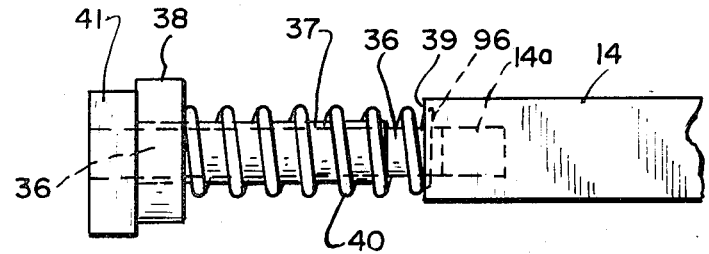
FIG. 6 is an enlarged fragmentary side elevational view as viewed from line 6 of FIG. 1.

The resilient feeder operating means for each feeder 14 includes a plurality of bolts 36 each attached to and extending forwardly from a cross bar 41 and slidably received in a recess 14a in a feeder 14. Each bolt slidably engages a cylindrical sleeve 37 integral on its outer end with a nut 38 (FIG. 6) adjustable threaded to a bolt 36. Extending between each nut 38 and the rear end 39 of each feeder 14 which contains the recesses 14a is a helical spring 40 concentric to a bolt 36 and sleeve 37. As is shown in FIG. 1 there are four bolt 36, sleeve 37, nut 38 and spring 40 combinations for each feeder 14. In each set of four the bolts 36 have their rear ends attached to and extending forwardly of the cross bar 41. The ram end of each spring is held in a circular recess 96 in the rear end 39 and integral with a recess 14a.

In order to adjust the precompression on each spring 40 each nut 38 is threaded to its bolt 36 so that by screwing and unscrewing each nut 38 closer to and further away from the rear 39 of its feeder 14 the compression on each spring 40 can be correspondingly changed.

Each cross bar 41 at about its midpoint and substantially centrally of the two pairs of springs 40 and associated structure is attached to a shaft 42 whose forward end 43 is attached to the rear of each feeder 14 and held therein by a combination of a screw thread fitting as shown in FIG. 2 and a set screw 44. The shaft 42 extends rearwardly through the midpoint of the cross bar 41 and to a substantial distance therebeyond with the rear end having attached thereto an enlarged disc 45 which is locked to this rear end of the shaft 42 as by a set screw 46. The disc 45 operates as an enlarged button which is engaged by the rearward movement of the horizontal bar 33 to move the pair of feeders 14 to a rearwardmost position. This rearwardmost position of the horizontal bar 33 and associated structure is indicated in FIG. 1 by the broken line 47 and this position is defined by a pair of spaced stops 48.

Projecting forwardly of the midpoint of the cross bar 41 is a journal sleeve 49 which serves as a bearing structure slidable on the shaft 42. With this arrangement each entire assembly of four sleeves 37 and nuts 38, four springs 40 and a cross bar 41 is movable under an applied force toward and away from each feeder 14 to apply a compressive feeding force to the material at the forward end 35 of the feeder 14.

Positioned immediately behind the cross bar 41 on each of the two shafts 42 is a retainer 50. This retainer is of generally circular construction and is provided with four equally spaced arcuately recessed retaining portions 51 on its rear edge. Each retainer 50 is of annular shape with its inner surface screw threaded and engaging the screw threaded end 52 of a bearing block 53. This bearing block is elongated with the threaded end 52 being the forward end and with the rear end being just forwardly of the disc 45. As is shown most clearly in FIG. 5, the block 53 is of square cross section and has attached to its bottom surface a thin bearing plate 54. The block 53 has an axial hole therethrough through which extends the shaft 42. The threaded retainer 50 being provided with the four retaining portions 51 spaced 90° apart can therefore be turned in 90° increments to adjust its longitudinal position in the threaded end 52 and always has an available retaining portion 51 on its top edge as shown in FIGS. 2–4. The retainer can then be locked in this position by means of a horizontal set screw 55 and in order to aid this locking the side of the annulus that contains the set screw 55 is split.

Cooperating with the retaining portion 51 is a catch 56 that is pivotally mounted about a pivot axle 57 between the spaced bifurcated arms 58 of a rearwardly extending member 59 which is pivotally mounted about an axle 60 at its front end 61. The axle 60 extends horizontally between the sides 62 of a bracket 63 mounted on a boss 64 that is located at the side of the hopper bottom section 12. The bracket 63 is attached to the boss 64 by screw means 65.

The pivot axle 60 for the member 59 is located at the front end 61 of this member 59 with the horizontal position of the member and thus the arms 58 when at rest being determined by an adjusting screw 66 that extends through the top of the bracket 63.

The catch 56 which is in the form of a pivoted lever has a forwardly extending part 67 provided with a latch portion end 68 of extensive area corresponding to the extensive surface area 51 of the retaining portion. In the illustrated embodiment this latch part 67 is about one inch wide in the horizontal dimension illustrated in FIG. 5 and the latch portion 68 is a section of a cylindrical surface of about ¼ inch diameter and extending for about 180°. The corresponding retaining portion 51 of extensive surface area, on the other hand, extends for only about 90° for trouble-free movement of the latch into engaging and disengaging position with respect to the surface 51.

In order to retain the catch 56 in operating position there is provided on the forward surface thereof a forward projecting flange part 69 that has attached to it one end of a tension spring 70 whose forward end is attached to a pin 71 that extends between the front ends of the parallel arms 58. As can be seen the catch member 59 when free to move in the manner to be described hereinafter is arcuately movable about its axle 60 that is mounted in the bracket 63 which functions as a base member.

Holding means are provided for holding the latch portion 68 in engagement with the retaining portion 51 of the retainer 50. In the illustrated embodiment this holding means comprises a pair of side brackets 72 for each shaft 42, retainer 50 and catch lever 59. Thus in the illustrated embodiment where there are two of each of these there are provided two pairs of brackets 72 mounted on the horizontal bar 33 which as explained forms an operating part of the drive for the feeders 14. Each pair of holding means brackets 72 are positioned on opposite sides of the forward ends 73 of the lever 59 and have extended ends 74 that are parallel to each other and that extend toward the hopper 11. These parallel ends of the brackets have undercut surfaces 75 and thus constitute undercut members beneath which are retained a pair of opposite rollers 78 that are mounted on the ends of the axle 57 on which the catch 56 is pivotally mounted.

As can be seen most clearly in FIG. 1, the bearing block 53 for each of the two shafts 42 is located directly below the catch lever 59 and between the holding brackets 72. Each of these two bearing blocks 53 with its bottom bearing plate 54 is positioned in a square notch 76 (FIG. 5) that extends downwardly from the top edge 77 of the horizontal bar 33.

The operation of the embodiment of FIGS. 1–6 is as follows:

With the hopper 11 containing ground raw meat or the like the drive mechanism which is shown and described as well as claimed in detail in the above copending application No. 26,814 of which this application is a continuation-in-part simultaneously retracts the pair of mold plates 26 to beneath the bottom plate 24 to the position shown in FIGS. 1 and 2 where the eight mold openings 27 are each in conjunction with its fill passage or slot 25 while retracting the horizontal bar 33 of the feeder 14 drive to urge these feeders to the right as shown in FIGS. 1 and 2 and apply feeding pressure to the meat or other plastic material within the extruding section 13. During these two movements which are caused by the drive bar 33 and pair of mold plates 26 being attached to their respective racks 20 and 29 as described earlier the plastic material as shown at 34 is forced under considerable pressure through the eight fill slot passages 25 into the corresponding mold openings 27. When the feeder operating bar 33 has reached its position shown in FIGS. 1 and 2 which is a movement from left to right and the mold plates 26 have reached their positions also shown in these Figures, or from right to left, the pair of levers 59 being heavily weighted on their rear ends as shown for example in FIG. 2 engage the latch portion 68 of the latch 56 with the retainer portion 51 that is in the top horizontal position of the retainer 50. The movement downwardly of this latch lever 59 is not accomplished solely by gravity but by reason of the inclined surfaces 75 on the holding means bracket 72 engaging and forcing downwardly the opposite rollers 78. As is shown in FIG. 1 when the feeder drive bar 33 has reached its position closest to the hopper 11 the rollers are retained beneath horizontal surfaces 79 on these brackets 72 with the result that the catch lever 59 and associated catch parts are firmly and positively held in latching position.

Then, when the movements of the drive racks are reversed to remove the patty 80 filled mold openings 27 from conjunction with the fill slot passages 25, or to the right as indicated by the arrow 81 in FIG. 3, the feeder operating apparatus including the horizontal bars 33 and the holding brackets 72 mounted thereon begin to move to the left as indicated by the arrows 82 in FIGS. 2 and 3. Because of the lost motion connection, however, the latch 56 for each feeder 14 remains in engagement with its retainer 50 due to the continuing engaging of the rollers 78 with the holding brackets 72, as shown in FIG. 3. During this period the mold plates 26 are moved out of conjunction with the fill slot 25 in each instance so that the effect is that the feeders 14 retain full feeding pressure on the material 34 until each mold opening 27 with its contained patty 80 has been moved out of communication with the compressed material 34.

After the mold openings 27 have thusly been moved out of communication with the fill slots 25 the cross bar 33 is continuing its rearward movement 82 engages the forward surfaces 83 of the pair of discs or buttons 45 so that continued movement of the cross bar 33 to the left as shown in FIG. 1 to the position indicated at 47 withdraws the feeders 14 to their rearwardmost positions indicated by the forward end lines 35 of FIG. 3 preparatory to the next feeding stroke of the feeders 14 all as described in the above application No. 26,814.

As can be seen from the above description of this embodiment the structure of this invention provides a positive acting large surface catch and retainer structure for holding one or more feeders 14 in their forwardmost position to apply maximum and continuing pressure to the moldable material 34 until the mold openings 27 with the material in them have been moved out of communication with the pressurized material in the hopper extruding section 13. Furthermore, this latching action is positive, does not depend on the weight of the parts to bring them into cooperation and provides large engaging surface areas on the catch and retainer for more reliable operation which is especially valuable under the high pressures encountered when simultaneously molding a multiplicity of articles such as the plastic food material patties of the illustrated embodiment. As stated, the embodiment as shown in FIG. 1 uses a pair of feeders 14 each feeding into a plurality of mold openings 27, as shown as four, so that a total of eight patties are produced simultaneously. It is, of course, obvious that more or less than eight patties could be produced without change in the invention and the invention is applicable to one or a plurality of feeders 14 and the operating parts therefor.

As explained earlier, the four retaining portions 51 on the rear edge of the retainer 50 spaced 90° apart permits rotational adjustment of the position of the topmost portion 51 that is engaged by the catch part 67. FIGS. 7 and 8 illustrate a second embodiment of a retainer 84 also mounted on its shaft 85 and provided on its top rear edge with a latch portion 86 which is also engageable with the catch portion 67 shown in the first embodiment. In the embodiment of FIGS. 7 and 8 the retainer 84 comprises a horizontal top member 87 provided with rack teeth 88 and a horizontal bottom section 89 provided with similar rack teeth 90 on its top surface. The oppositely located rack teeth 88 and 90 engage similar rack teeth 91 and 92 on the top and bottom surfaces of a bearing block 93 otherwise similar to the bearing block 53 of the first embodiment. This bearing block 93 also is provided with a bottom bearing plate 94 similar to the bearing plate 54 and also slidably engaging the bottom of an upwardly opening square notch 76 as illustrated in the first embodiment.

The opposite sides of the top 87 and bottom 89 members are connected by side vertical bolts 95 so that in adjusting the position of the retainer 84 on the forward end of the bearing block 93 it is only necessary to loosen the side bolts 95, move the retainer 84 either to the right or the left from its position shown in FIG. 7 and retighten these bolts so that the latch portion 86 will then be in proper position to be engaged by the catch part 67 as in the first embodiment.

Having described my invention as related to the embodiments shown in the accompanying drawings, it is my intention that the invention be not limited by any of the details of description, unless otherwise specified, but rather be construed broadly within its spirit and scope as set out in the appended claims.

I claim:

1. Molding apparatus, comprising: a hopper for retaining a supply of a moldable material and including an extruding section with passage means therefrom; feeder means in said extruding section movable in a path away from and toward a position adjacent said passage means to force material therethrough; feeder operating means for thusly moving said feeder in said path; a movable mold having a mold opening movable away from and toward said passage means out of and into communication with said passage to receive material therefrom when said opening is in said communication and said feeder is in said adjacent position; mold operating means for thusly moving said mold; catch means engaging said feeder operating means for retaining said feeder in said adjacent position while said mold opening is in communication with said passage means, said catch means comprising a pivoted lever having a latch portion of extensive surface area engaging a retainer having a retaining portion of similar extensive surface area on said feeder operating means; and means for releasing said catch means on movement of said mold opening out of said communication with said passage means.

2. The apparatus of claim 1 wherein said feeder operating means comprises yieldable force transmitting spring means comprising a plurality of individual springs and means for adjusting the force of each said spring independently of the others.

3. The apparatus of claim 1 wherein said feeder operating means comprises a linkage operatively attached to said feeder and on which said retainer is mounted.

4. The apparatus of claim 1 wherein said feeder operating means comprises yieldable force transmitting spring means and a linkage operatively attached to said feeder and on which said retainer is mounted.

5. The apparatus of claim 1 wherein there are provided means for interconnecting said feeder operating means and said mold operating means for joint operation thereof, and there are provided means for moving said feeder and mold opening substantially simultaneously toward said passage means and substantially simultaneously away from said passage means.

6. The apparatus of claim 1 wherein there are provided a base member, a lever hingedly mounted on said base member and carrying said catch means, and holding means carried by said mold operating means for holding said latch portion of said catch means in engagement with said retaining portion of said retainer while said mold opening is in communication with said passage means.

7. The apparatus of claim 6 wherein said holding means comprises a pair of spaced undercut members between which said latch portion is located when in engagement with said retaining portion, and a pair of rollers on opposite sides of said latch portion and engaged by the undercut members.

8. The apparatus of claim 7 wherein said undercut members each has a sloped undercut surface means for providing a wedge action forcing said catch means into engagement with said retainer.

9. The apparatus of claim 6 wherein said lever is mounted on said base member for arcuate movement toward and away from said retainer, said catch means is mounted on said lever for pivotal movement to and from engagement with said retainer, and means are provided urging said catch portion into engagement with said retainer.

10. The apparatus of claim 9 wherein said feeder operating means comprises a linkage operatively attached to said feeder and on which said retainer is mounted, and a second linkage movable relative to the first linkage during initial movement of said feeder away from said passage means, said holding means being mounted on said second linkage for movement therewith.

11. The apparatus of claim 10 wherein said holding means comprises a pair of spaced undercut members between which said latch portion is located when in engagement with said retaining portion, and a pair of rollers on opposite sides of said latch portion and engaged by the undercut members.

12. The apparatus of claim 11 wherein said undercut members each has a sloped undercut surface means for providing a wedge action forcing said catch means into engagement with said retainer.

13. The apparatus of claim 12 wherein said feeder operating means comprises yieldable force transmitting spring means comprising a plurality of individual springs and means for adjusting the force of each said spring independently of the others.

14. Molding apparatus for shaping a series of articles, comprising: a hopper for retaining a supply of plastic material; a movable mold operatively adjacent said hopper having a mold opening; passage means extending from said hopper for supplying said material to said mold opening; a feeder in said hopper movable toward and away from said passage means to force said material into said mold opening; means movable in a path for thusly moving said feeder including a pair of interconnected linkages movable relative to each other over a portion of said path in an initial portion of said movement of the feeder away from said passage means, one said linkage being operatively attached to said feeder; means for moving said mold to a position where said opening is out of communication with said passage means; a base member; a catch hingedly mounted on said base member; a retainer operatively attached to said one linkage in engagement with said catch when said feeder is in position adjacent said passage means to hold said feeder in said position until said mold opening is out of communication with said passage means, said catch comprising a pivoted lever having a latch portion of extensive surface area engaging a retaining portion of similar extensive surface area when in said engagement; means on the other of said linkages for preventing disengagement of said catch from said retainer until said pair of linkages have been moved apart in said portion of said path; and means for thereupon disengaging said catch and retainer.

15. The apparatus of claim 14 wherein there are provided means for adjusting the position of said retainer on said one linkage, thereby adjusting the position of the retainer relative to said catch.

16. The apparatus of claim 15 wherein said retainer and said one linkage are provided with cooperating rack teeth comprising said means for adjusting.

17. The apparatus of claim 15 wherein there are provided a screw thread on said retainer engaging a similar screw thread on said one linkage for said adjusting.

18. The apparatus of claim 17 wherein said retainer is provided with a plurality of circumferentially spaced retaining portions.

* * * * *